(12) United States Patent
Van Hoof et al.

(10) Patent No.: US 7,946,015 B1
(45) Date of Patent: May 24, 2011

(54) METHOD AND APPARATUS FOR SEPARATING DUMMY DISC FROM MULTI-LAYER SUBSTRATE FOR OPTICAL STORAGE MEDIUM

(75) Inventors: Petrus Hubertus Van Hoof, Moosic, PA (US); Lewis Gensel, Spring Brook, PA (US)

(73) Assignee: Cinram International Inc., Scarborough (CA)

( * ) Notice: Subject to any disclaimer, the term of this patent is extended or adjusted under 35 U.S.C. 154(b) by 811 days.

(21) Appl. No.: 11/936,625

(22) Filed: Nov. 7, 2007

(51) Int. Cl.
*B21D 39/00* (2006.01)
*B23P 19/00* (2006.01)
*B25B 11/00* (2006.01)

(52) U.S. Cl. .................. 29/426.1; 29/426.4; 29/426.5; 29/527.1; 29/527.2; 29/700; 29/743; 29/239; 156/344; 269/21

(58) Field of Classification Search ............ 29/603.01, 29/603.02, 603.06, 426.1, 426.2, 426.4, 426.5, 29/426.6, 525.13, 527.1, 527.2, 700, 743, 29/762; 156/344; 269/21
See application file for complete search history.

(56) References Cited

U.S. PATENT DOCUMENTS

| | | | |
|---|---|---|---|
| 4,995,799 A | 2/1991 | Hayashi et al. | |
| 5,171,392 A * | 12/1992 | Iida et al. | 156/273.3 |
| 5,181,081 A | 1/1993 | Suhan | |
| 5,315,107 A | 5/1994 | Smith et al. | |
| 5,766,359 A | 6/1998 | Sichmann et al. | |
| 5,766,495 A | 6/1998 | Parette | |
| 5,792,538 A | 8/1998 | Yuresko-Suhan | |
| 5,800,687 A | 9/1998 | Kempf | |
| 5,863,328 A | 1/1999 | Sichmann et al. | |
| 5,863,399 A | 1/1999 | Sichmann | |
| 5,900,098 A | 5/1999 | Mueller et al. | |
| 5,913,653 A | 6/1999 | Kempf | |
| 5,932,042 A * | 8/1999 | Gensel et al. | 156/74 |
| 5,932,051 A * | 8/1999 | Mueller et al. | 156/228 |
| 5,932,058 A | 8/1999 | Mueller | |
| 5,935,673 A | 8/1999 | Mueller | |
| 5,949,752 A | 9/1999 | Glynn et al. | |
| 5,958,651 A | 9/1999 | Van Hoof et al. | |
| 5,972,159 A * | 10/1999 | Uryu et al. | 156/344 |
| 5,995,481 A | 11/1999 | Mecca | |
| 5,997,976 A | 12/1999 | Mueller et al. | |
| 6,117,284 A | 9/2000 | Mueller | |
| 6,124,011 A | 9/2000 | Kern | |
| 6,160,787 A | 12/2000 | Marquardt, Jr. et al. | |
| 6,261,403 B1 | 7/2001 | Gerigk et al. | |
| 6,309,496 B1 * | 10/2001 | Van Hoof | 156/230 |
| 6,309,727 B1 | 10/2001 | Mueller et al. | |
| 6,361,845 B1 | 3/2002 | Kern | |
| 6,368,435 B1 | 4/2002 | Kempf | |
| 6,440,248 B1 | 8/2002 | Mueller | |
| 6,478,069 B1 | 11/2002 | Fujisaku et al. | |
| 6,503,130 B2 * | 1/2003 | Lim | 451/285 |
| 6,527,538 B1 | 3/2003 | Pickutoski et al. | |
| 6,569,259 B1 * | 5/2003 | Kagawa | 134/37 |
| 6,726,973 B2 | 4/2004 | Mueller | |

(Continued)

OTHER PUBLICATIONS

U.S. Appl. No. 11/705,682, filed Feb. 13, 2007 of Michael Parette.

(Continued)

*Primary Examiner* — Jermie E Cozart
(74) *Attorney, Agent, or Firm* — Cooper & Dunham LLP

(57) ABSTRACT

A method and an apparatus which can be used for separating a dummy disc from a substrate in a process for manufacturing multi-layer optical storage discs are provided.

5 Claims, 12 Drawing Sheets

The top bend arms move down, bending the disc over the disc carrier to cause the PMMA dummy disc to break, and then the interface between the PMMA and the reflective layer releases except for the small part around the area where the top bend arms are pushing.

The top suction cups are lowered onto the PMMA

U.S. PATENT DOCUMENTS

| | | |
|---|---|---|
| 6,814,825 B2 | 11/2004 | Becker et al. |
| 6,896,829 B2 | 5/2005 | Kern et al. |
| 7,325,287 B2 | 2/2008 | Sweeney |
| 7,419,045 B2 | 9/2008 | Kelsch |
| 7,535,806 B2 | 5/2009 | Fumanti |
| 7,564,771 B2 | 7/2009 | Sweeney |
| 2005/0031778 A1 | 2/2005 | Inoue |
| 2005/0039675 A1 | 2/2005 | Kang et al. |
| 2005/0042371 A1 | 2/2005 | Ushida et al. |
| 2005/0048250 A1 | 3/2005 | Yamaga et al. |
| 2005/0052985 A1 | 3/2005 | Senshu et al. |
| 2005/0053728 A1 | 3/2005 | Komaki |
| 2005/0053752 A1 | 3/2005 | Komaki |
| 2005/0072336 A1 | 4/2005 | Itoh et al. |
| 2005/0072518 A1 | 4/2005 | Komaki et al. |
| 2005/0109454 A1 | 5/2005 | Katoh et al. |
| 2005/0112319 A1 | 5/2005 | Itoh et al. |
| 2005/0132395 A1 | 6/2005 | Hisada et al. |
| 2005/0147809 A1 | 7/2005 | Hongo et al. |
| 2005/0158504 A1 | 7/2005 | Itoh et al. |
| 2005/0175771 A1 | 8/2005 | Hisada |
| 2005/0281179 A1 | 12/2005 | Kang et al. |
| 2006/0023598 A1 | 2/2006 | Babinski et al. |
| 2006/0101634 A1 | 5/2006 | Sweeney |
| 2006/0104190 A1 | 5/2006 | Babinski |
| 2006/0165419 A1 | 7/2006 | Musto |
| 2006/0181706 A1 | 8/2006 | Sweeney |
| 2006/0222808 A1 | 10/2006 | Pickutoski et al. |
| 2006/0270080 A1 | 11/2006 | Rinaldi |
| 2006/0274617 A1 | 12/2006 | Musto et al. |
| 2007/0014224 A1 | 1/2007 | Sweeney |
| 2007/0029167 A1 | 2/2007 | Kelsch |
| 2007/0090006 A1 | 4/2007 | Kelsch |
| 2007/0098947 A1 | 5/2007 | Mueller |

OTHER PUBLICATIONS

U.S. Appl. No. 11/715,249, filed Mar. 6, 2007 of William R. Mueller et al.
U.S. Appl. No. 11/726,968, filed Mar. 22, 2007 of Lewis Gensel et al.
U.S. Appl. No. 11/938,572, filed Nov. 12, 2007 of Dominick A. Dallaverde et al.
U.S. Appl. No. 12/126,667, filed May 23, 2008 of Ed Pickutoski.
U.S. Appl. No. 11/705,682, filed Feb. 13, 2007.
U.S. Appl. No. 11/715,249, filed Mar. 6, 2007.
U.S. Appl. No. 11/717,229, filed Mar. 12, 2007.
U.S. Appl. No. 11/726,968, filed Mar. 22, 2007.

* cited by examiner

Disc is placed on The disc carrier the PMMA side layer facing up

The top bend arms move down, bending the disc over the disc carrier to cause the PMMA dummy disc to break, and then the interface between the PMMA and the reflective layer releases except for the small part around the area where the top bend arms are pushing.

The top bend arms move back up, the disc relaxes.

The top suction cups are lowered onto the PMMA

Vacuum is switched on to the bottom suction cups, The bottom disc is flexed and the remaining interface between PMMA and reflective layer releases.

Vacuum is switched on to the top suction cups and the PMMA is lifted from the bottom substrate.

The vacuum is removed from the bottom suction cup and the bottom disc relaxes. The splitting process is completed the PMMA dummy side is recycled.

METHOD AND APPARATUS FOR SEPARATING DUMMY DISC FROM MULTI-LAYER SUBSTRATE FOR OPTICAL STORAGE MEDIUM

TECHNICAL FIELD

This application relates to optical storage media. In particular, the application relates to a method and apparatus for separating a dummy disc from a multi-layer optical storage medium substrate.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is pre-recorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder or electron beam recorder to form pits in a photoresist or a dye-polymer layer on an optical grade glass disc known as a glass master in a mastering process. A metallized glass master is used in an electroforming process to form (typically, metal) stampers. A stamper is used on one side of an injection molding cavity to emboss a layer of pits and lands on a transparent polymer substrate formed by injection molding. The information bearing surface of the substrate is then covered with a reflective film (of metal or alloy) or the like, to form an information layer. In the case of a CD, a plastic protective coating is applied over the reflective film, and then art (for example, a picture, a design, text, etc.) is typically printed on the upper surface of the disc (that is, on the side of the substrate which bears the information layer), to form an end product which is 1.2 mm thick. In the case of DVDs, two half-thickness substrates (that is, approximately 0.6 mm each) are typically formed, metallization is applied to one (for example, DVD-5) or both (for example, DVD-10, DVD-9, DVD-18) half-thickness substrates, and the two half-thickness substrates are bonded by an adhesive (for example, hot-melt adhesive, ultraviolet light-cured adhesive, etc.), with the information layer being shielded from the external environment by the half-thickness substrates as cover layers. A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disc also uses multiple layers beginning with a polycarbonate plastic substrate containing a shallow spiral groove extending from the inside to the outside diameter of the disc. A DVD-RW disc (or a DVD-RAM disc) may additionally inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disc, and a pit or mark in a recordable or rewritable optical disc). During erase, the laser (in a process called "annealing") changes the amorphous areas back into more crystalline areas.

Some exemplary optical disc manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973 and 6,896,829, which are incorporated by reference herein in their entireties in order to more fully describe the state of the art as of the date of the subject matter described and claimed herein. Additional exemplary techniques are discussed in U.S. Pat. Nos. 4,995,799, 5,766,359, 5,800,687, 5,863,328, 5,863,399, 5,913,653, 6,261,403, 6,368,435 and 6,814,825, which are also incorporated by reference herein in their entireties.

Optical disc players for optical discs which conform with one of the CD or DVD formats use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as HD DVD and BD (each of which includes read-only, recordable and rewritable formats). The popularity of optical storage media driven by advancements in computer, information communication and multimedia technologies has been accompanied also by demands for a higher density and a greater capacity of optical storage media. HD DVD and BD provide high density formats and multiple recording layer formats which attempt to meet such demands.

HD-DVD format discs can be replicated using a process similar to the process for forming a DVD disc, except that the minimum pit length is shorter and therefore the laser beam recorder or electron beam recorder used in the mastering process must be adapted to form the shorter pits.

BD format discs have a substantially different structure than HD-DVD, DVD and CD discs. Each information layer in HD-DVD and DVD discs is closer to the middle of the disc than the read surface of the disc (to which the laser beam is directed), and an information layer in a CD disc is approximately 1.2 mm from the read surface of the disc. In contrast, the information layer in the BD format disc is separated from the read surface by approximately 0.1 mm (that is thickness of a transparent cover layer). The BD format disc utilizes a substrate which is approximately 1.1 mm in thickness. While a single recording layer BD disc can store 25 GB of data, a dual recording layer BD disc can store 50 GB of data (BD50).

Although a specification for multiple recording layer BD formats is now available, there is a need for proven and reliable techniques for manufacturing BD discs that comply with the multi-layer BD formats.

SUMMARY

This disclosure describes a method and an apparatus which can be used for separating a PMMA (polymethyl methacrylate) dummy disc from a substrate in a process for manufacturing multi-layer optical storage discs.

As discussed in more detail infra, a multi-layer (that is multiple recording layer) disc can be formed by using a PMMA process, wherein (i) first and second reflective layers are formed (for example, by sputtering) on a PMMA dummy disc and another substrate (of, for example, polycarbonate), respectively, formed by usual molding techniques, (ii) the PMMA dummy disc (bearing first reflective layer) is bonded to the second reflective layer on the other substrate, with the adhesive forming a space layer separating the reflective layers, (iii) when the dummy disc is separated, the first reflective layer and pit structure are separated from the PMMA disc and remain on the other substrate.

The present disclosure provides a method and apparatus which can successfully separate the PMMA dummy disc from the reflective layer, without damaging pits formed in the adhesive layer, even when the other substrate is greater than 0.6 mm in thickness.

BRIEF DESCRIPTION OF THE DRAWINGS

The features of the present application can be more readily understood from the following detailed description with reference to the accompanying drawings wherein.

DETAILED DESCRIPTION

Examples and exemplary embodiments of methods for manufacturing a multi-layer optical storage medium are discussed herein. In describing examples and exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

For example, exemplary embodiments are discussed below with reference to BD dual layer (BD-DL) discs. However, it should be apparent after reading this disclosure that the subject matter of this disclosure also encompasses other types of multiple layer optical storage medium.

Figure 1A:
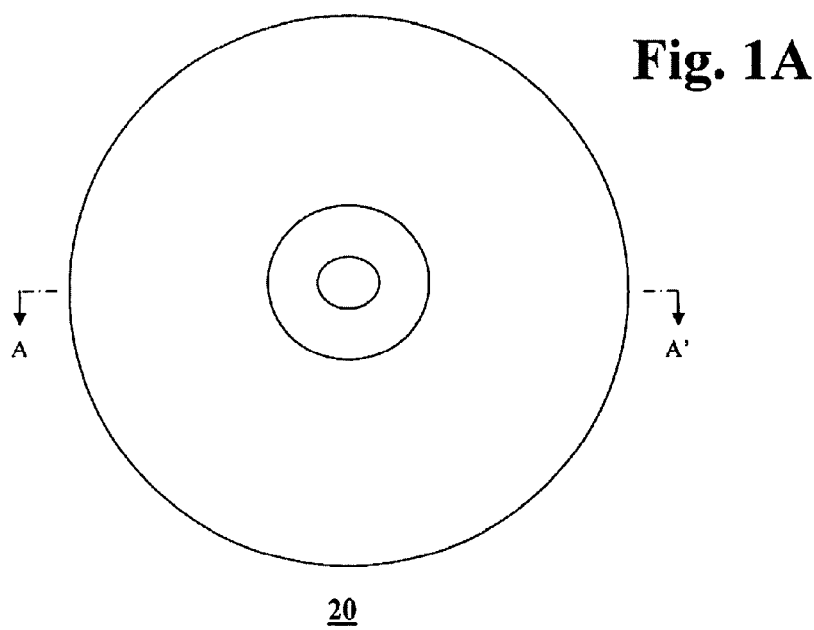
FIGS. 1A through 1C show a plan view, a sectional view and an exploded, notional view along a track direction of a BD-SL disc.
Figure 1B:
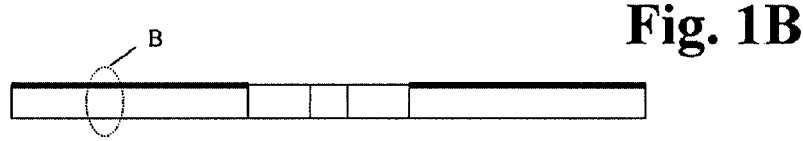
Figure 1C:
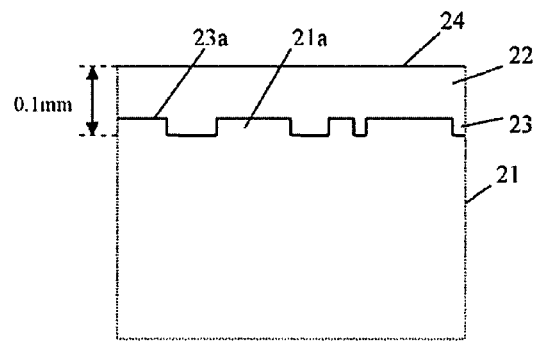

FIGS. 1A-1C show an example of a BD single layer (BD-SL) disc. BD-SL disc 20 comprises a substrate 21 (with information bearing side 21a), an information layer 23 including a reflective layer 23a over the information bearing side 21a of the substrate 21 and a light-transmitting cover layer 22. The cover layer 22 has a thickness of approximately 0.1 mm. The optical recording disc 20 has a thickness in a range of 0.9 mm to 1.4 mm.

In one example, a method for manufacturing BD-SL discs includes molding the substrate 21, applying (such as by sputtering) the reflective layer 23a over the information-bearing side 21a of the substrate 21 (the information layer 23 is comprised of the combination of the reflective layer 23a and the information bearing side of the substrate), and forming the light-transmitting cover layer 22 over the information layer 23. Some additional examples are discussed in commonly-owned U.S. application Ser. No. 60/781,085, the entire contents of which is incorporated herein by reference.

The substrate 21 can be injection molded from a material used conventionally for optical disc substrates, such as polycarbonate resins, acrylic resins (for example, polymethyl methacrylate, i.e. PMMA), polyolefine resins, or the like.

The reflective layer 23a can be deposited by a sputtering process (or evaporation) on the information-bearing side of the substrate 21. A material of the reflective layer may include a metallic element, semi-metallic element, semiconductor element, or a composite thereof. Suitable materials for the reflective layer include Al, Au, Ag, Cu, Ni, In, Ti, Cr, Pt, Si, alloy, etc. The reflective layer is preferably a thin film having a thickness of 5 nm to 200 nm.

The resin that is used to form the light-transmitting cover layer 22 can include polycarbonate, an ultraviolet curable resin (such as the type that can be used as an adhesive to bond a layer to a substrate or to another layer in an optical disc), an electron ray curable resin or another radiation curable resin. The light transmitting layer formed with such a resin should be optically transparent, exhibit low optical absorption or reflection in the laser wavelength range to be used, and have low birefringence.

A protective hard coat 24 which has properties of scratch resistance and abrasion resistance preferably covers the cover layer 22. The hard coat may be formed on the cover layer by applying a hardcoat agent composition (for example, UV hardening resin) on the cover layer, followed by curing through irradiation with active energy rays such as ultraviolet rays, electron rays or visible rays.

The substrate 21 and the information layer 23 in combination with the cover layer 22 and the protective hardcoat 24 can comply with the requirements of, for example, a BD read-only disc. For such a disc, the information layer 23 includes a series of pits embossed in a plane of land (by a stamper in the injection molding process), all of which being covered by the reflective layer 23a. In addition, the information layer 23 comprises an information track having pits with a minimum length along the track in a range of 138 nm to 160 nm. The information layer can comprise information marks configured for reading using a laser with a wavelength in a range of 400 nm to 420 nm and a numerical aperture of 0.85, and can have information capacity of 23 GBytes or more.

The disc can include multiple information layers (not shown). In the case of the disc having two information layers, the upper information layer (that is, closer to the light-transmitting cover layer) is covered by a semi-reflective layer (for example, gold, silicon, silver, alloy, etc.) and the lower information layer (that is, further from the cover layer) is covered by a reflective layer (for example, aluminum, etc.).

Methods of making BD-DL discs using a Polycarbonate (PC) disc process have been proposed. In the PC disc process, a PC disc is used to replicate a layer 1 information surface in an adhesive that resides on a 1.1 mm layer 0 substrate. Thereafter, the disc is removed, the metal layer is sputtered over the surface, and the cover layer and hard coat are then applied on a standard BD-SL manufacturing line. Such a process has a number of drawbacks.

For example, two types of adhesive resins are needed in the process, because of the adhesive characteristics of PC. One resin ("resin A") adheres well to the layer 0 metal, and the other resin ("resin B") adheres well to resin A but not to the Polycarbonate disc.

Further, the sputtering of the metal layer over the information surface must occur after separation. The information surface typically has been subject to contamination during and after the splitting process.

In addition, the process requires that new equipment be installed adjacent to the BD-SL equipment.

On the other hand, other methods utilizing a polymethyl methacrylate (PMMA) process have been devised and implemented. MAMA materials offer several advantages over polycarbonate. One of the advantages is that PMMA is cheaper. MAMA absorbs much more moisture than polycarbonate, and moisture can cause the various layers of a CD or DVD to release from each other. Therefore, PMMA is not typically used to make CDs and DVDs. However, because it is actually desired that a metallic layer release from a substrate in the PMMA process, the substrate which does not end up as part of the finished disc can be made of PMMA. Since PMMA does not bond well to aluminum, and adhesion is only through molecular roughness, PMMA can be used to aid in the transfer of the semi-reflective coating from one substrate to the other.

Figure 2:
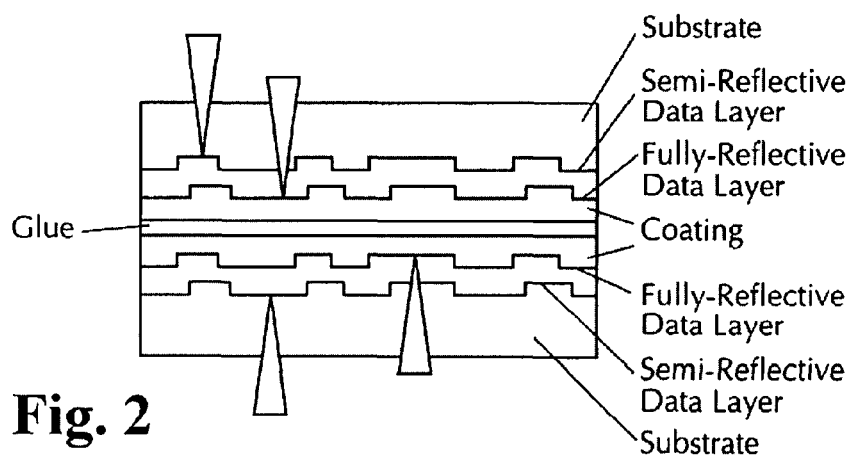
FIG. 2 illustrates a notional view along a track direction of an example of a dual-layer, double-sided DVD-18 disc.

Some examples of methods utilizing a PMMA process for making multiple recording layer discs are described in U.S. Pat. Nos. 6,117,284 (Mueller) and 6,309,496 (Van Hoof), the entire contents of each of which is incorporated herein by reference. Such methods can be utilized to form DVD 18 discs (that is, double-sided DVDs with two information layers per side for a total of four information layers per disc). An example of a DVD 18 disc is shown in FIG. 2.

Figure 3A:
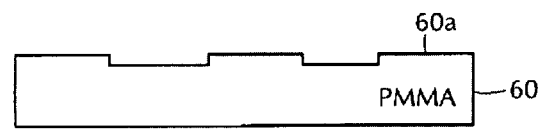
FIG. 3 illustrates an example of a method for making a DVD 18 disc utilizing a PMMA process.
Figure 3B:
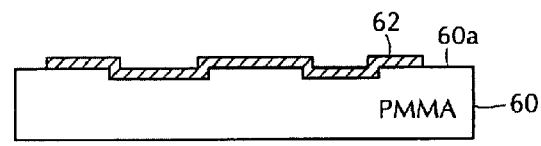
Figure 3C:
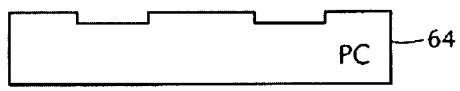
Figure 3D:
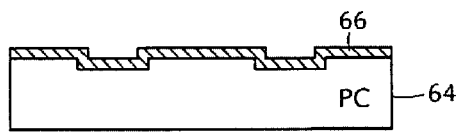
Figure 3E:
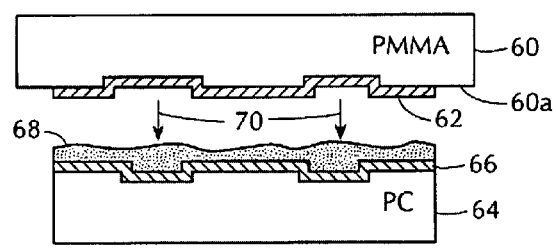
Figure 3F:
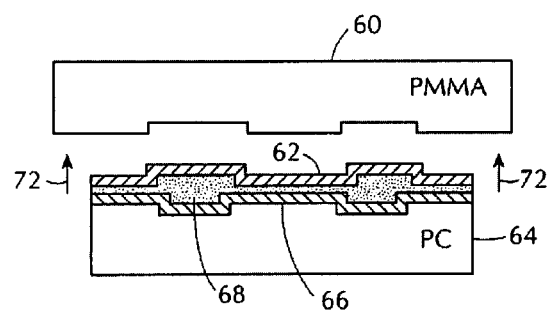

An example of a method for making a DVD 18 disc utilizing a PMMA process will now be described with reference to FIGS. 3A-3F. PMMA substrate 60 in FIG. 3 is molded in the usual way (FIG. 3A), and surface 60a of the substrate 60 is the information layer from which layer 1 in a dual-layer DVD is to be replicated. A fully reflective aluminum layer 62 is then sputtered onto the surface 60a (FIG. 3B). Before sputtering, if desired, a release material such as silicone may be placed on the surface 60a (or mixed in the plastic so that it migrates to the surface) to aid in the eventual separation of the reflective layer 62 from the substrate. Substrate 64 is made of the usual material (for example, polycarbonate) (FIG. 3C), and an information surface of the substrate 64 is coated with a semi-reflective (for example, gold, silver or alloy) layer 66 (layer 0 of the finished disc) (FIG. 3D).

The PMMA substrate 60 (also referenced below as "dummy disc") is positioned so that the reflective layer 62 faces semireflective layer 66. Before the PMMA substrate 60 is moved in direction 70, a bonding layer 68 (shown much thicker than its true thickness of about 55 microns) is placed on semireflective layer 66. When the two substrate structures are brought together, the reflective layer 62 transfers from the substrate 60 to the bonding (adhesive) layer 68. The transfer is facilitated not only by the nature of the PMMA material (and any release materials that are employed), but also by the bonding material 68 which is designed to adhere to aluminum. A force is applied in direction 72 on the PMMA flange to separate it from the remaining structure. The PMMA substrate 60 has a diameter larger than the diameter of the substrate 64, so that there will be an area against which a separating force can be applied. The reflective layer 62 remains with the polycarbonate substrate structure 64. The usual protective coating may then be applied (not shown) in the making of a dual-layer 0.6-mm substrate. Finally, another single-layer or dual-layer substrate structure is bonded (not shown) to the dual-layer structure to make a DVD-14 or DVD-18 disc.

Figure 4:
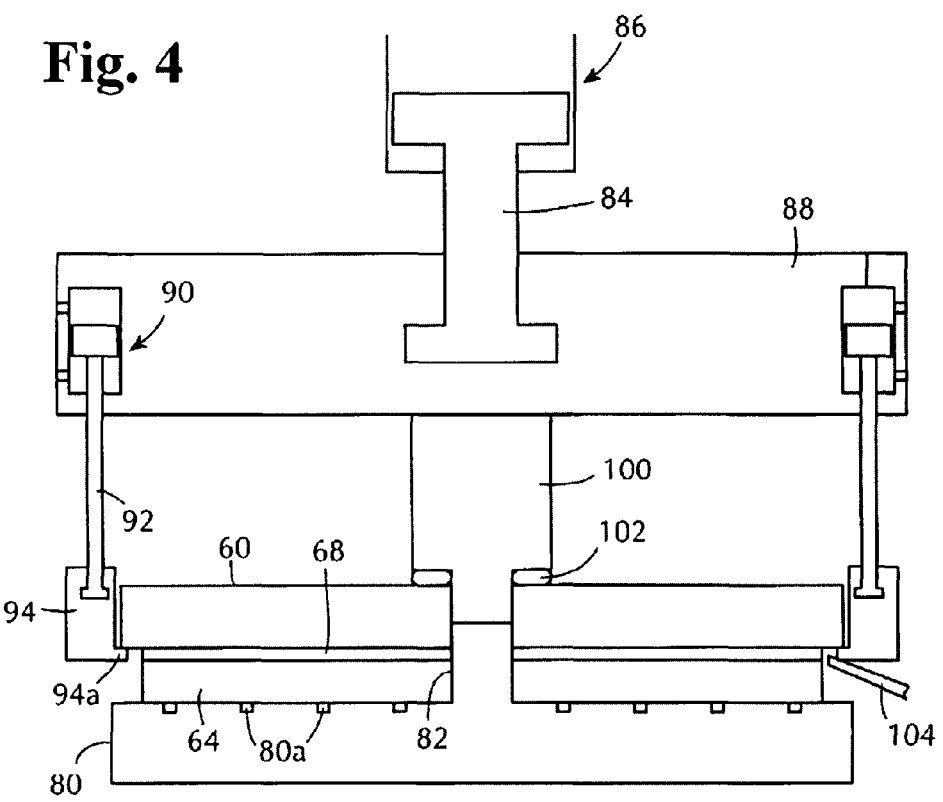
FIG. 4 depicts a diagrammatic view of an apparatus for facilitating transfer and separation steps in the method of FIG. 3.

FIG. 4 depicts diagrammatically an apparatus proposed in U.S. Pat. No. 6,117,284 (Mueller) for use during the manufacture of a dual-layer disc, after the individual substrate structures have been formed and the fully reflective layer 62 is to be transferred to the substrate 64 structure (consisting of the PC substrate 64 and the semireflective layer 66). Base 80 supports the substrate 64 structure consisting of substrate 64 and semireflective coating 66. Ports 80a are coupled to a vacuum source to hold the substrate structure firmly in place until it is time for it to be released. A center post 82 properly positions the substrate structure.

Plate 88 is moved vertically by lift cylinder 86 and arm 84. Post 100 bears against a cushion 102 (an annular ring) which, in turn, rests on the substrate 60 structure consisting of the PMMA substrate 60 and its fully reflective coating 62. Before the upper substrate 60 structure is lowered, adhesive 68 is sprayed on top of the lower substrate 64 structure by nozzle 104. The arm 84 is lowered to effect contact of the two substrate structures, and transfer of the fully reflective layer 62 from the PMMA substrate 60 to the polycarbonate substrate 64.

To separate the dummy disc 60 from substrate 64 from each other after the adhesive has hardened, the two trip cylinders 90 pull rods 92 upward so that fingers 94, whose engaging surfaces 94a bear against the undersurface of the dummy disc 60, apply an upward force to the dummy disc 60. The post 100 and cushion 102 hold the center of the dummy disc 60 in place while the edge is lifted slightly. Then the entire assembly is raised by lift cylinder 86 to effect the final separation of the substrates.

The method and apparatus proposed in U.S. Pat. No. 6,478,069 (Fujisaku et al.) [the entire contents of which is incorporated herein by reference] can also be used for making multiple recording layer discs. utilizing a PMMA process.

Figure 5:
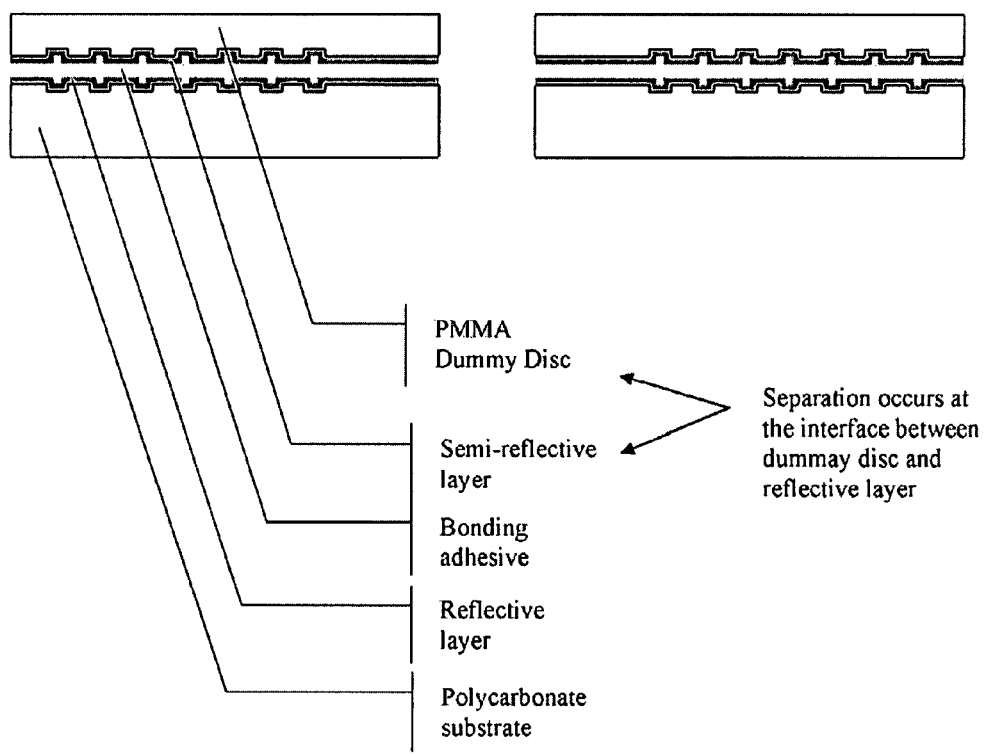
FIG. 5 illustrate a notional, cross-sectional view along a radial direction of an example of a BD-DL disc.

The PMMA process can also be utilized for manufacturing BD-DL discs. An example of a BD-DL disc is illustrated in FIG. 5.

A method for making BD-DL discs using a PMMA process will now be described. In this process, a pre-sputtered layer 1 information surface is replicated and bonded to layer 0 in a manner similar to the method for making DVD 18 discs as discussed above and using the equipment that is used for making DVD 18 discs, with the exception that a 1.1 mm mold is used for layer 0. Since PMMA has low adhesion to the metal layer it can be easily removed.

However, the separation method used in the DVD 18 process is not suitable for making BD-DL discs, since the layer 0 in a BD resides on a 1.1 mm substrate as opposed to residing on a 0.6 mm substrate (as in the case of DVD 18). When the method and apparatus proposed in U.S. Pat. No. 6,478,069 (Fujisaku et al.) was used in the PMMA process for replicating a multi layer optical disc with a substrate thickness greater than 0.6 millimeter (such as BD-DL discs), a problem was encountered. The PMMA dummy disc did not detach from the polycarbonate substrate without damaging the pit structure formed in the adhesive.

The angle between the PC substrate and the PMMA dummy disc needs to be great enough to facilitate release. For BD-DL discs, the PC substrate is thicker and does not flex enough to facilitate proper release. In addition, the pit size is smaller and density is greater, and therefore adhesion is better and more resistant to proper release.

Figure 6:
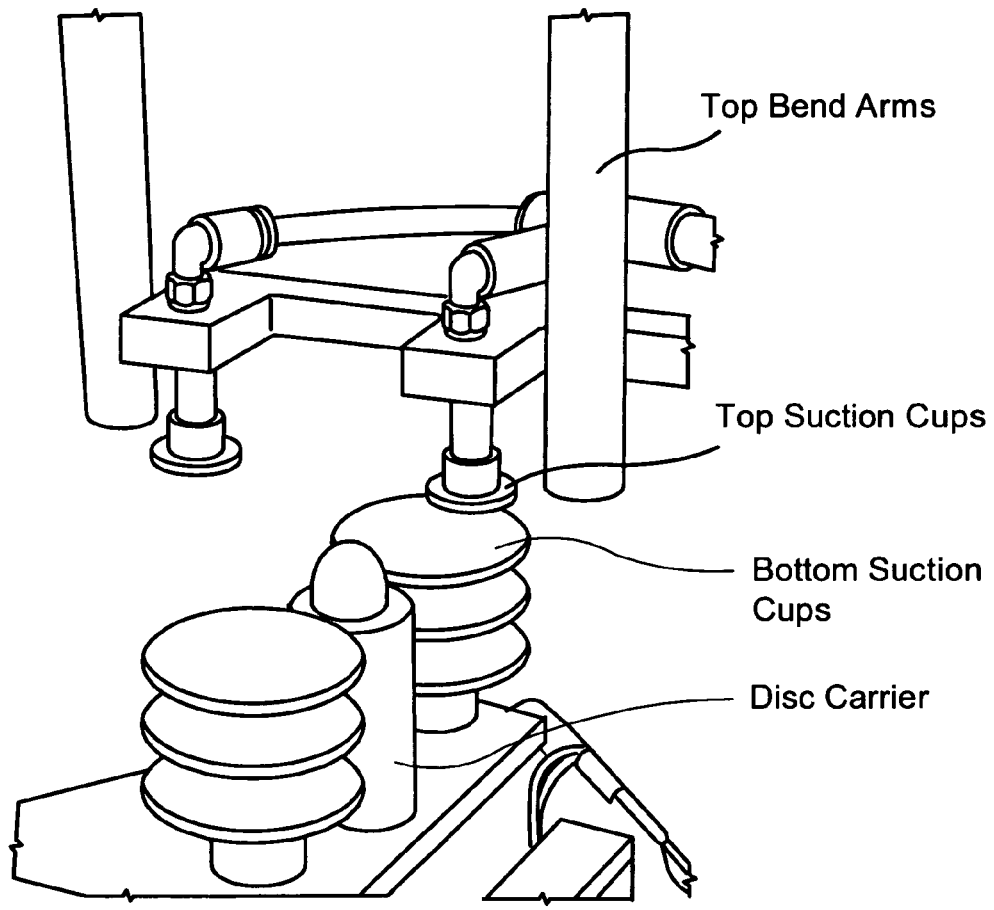
FIG. 6 depicts a device for separating a PMMA dummy disc from a substrate for a BD-DL disc.
Figure 7A:
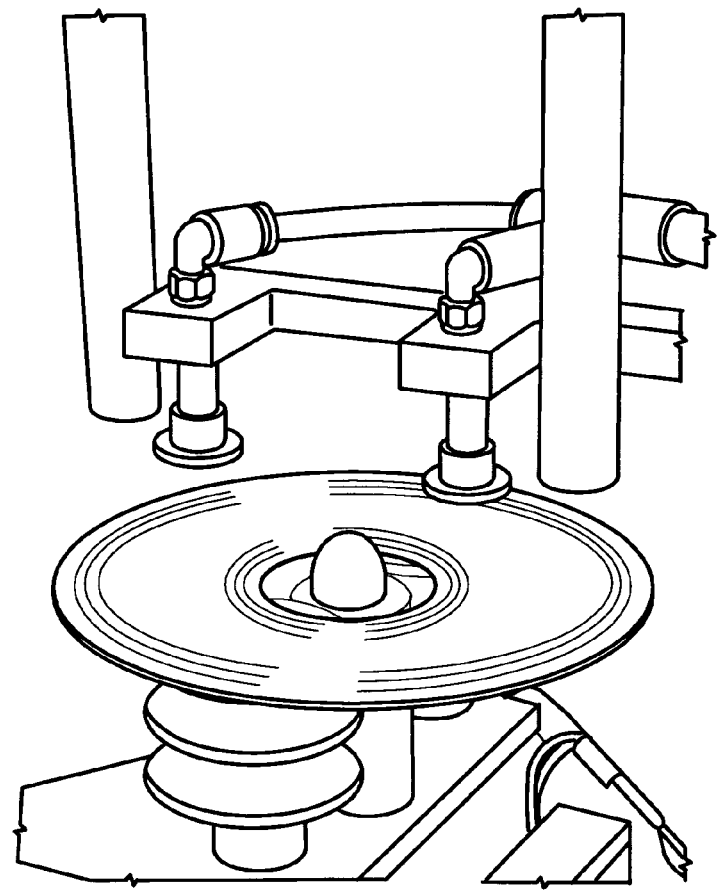
FIGS. 7A-7G illustrates a method for separating a PMMA dummy disc from a substrate for a BD-DL disc utilizing the device of FIG. 6.
Figure 7B:
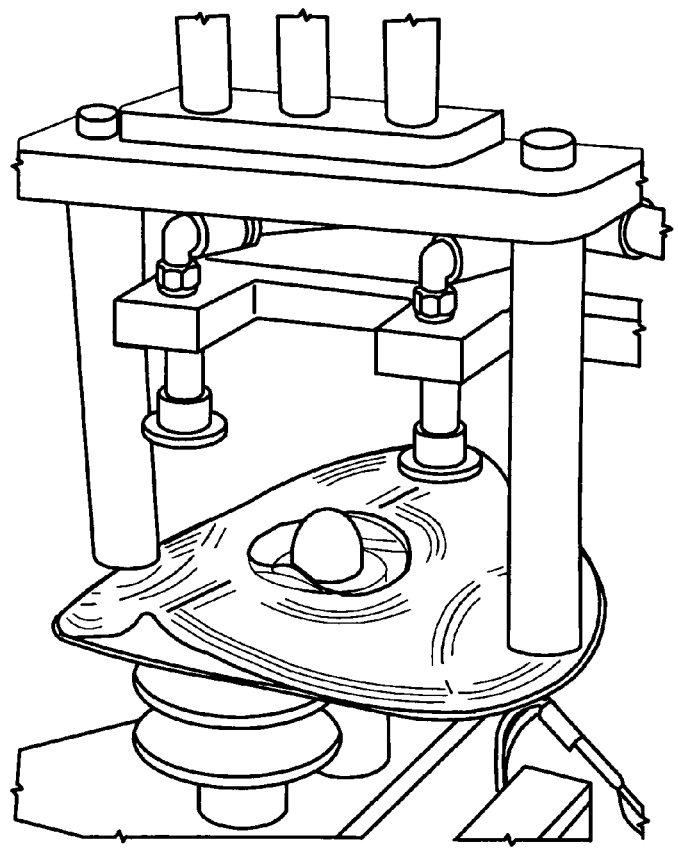
Figure 7C:
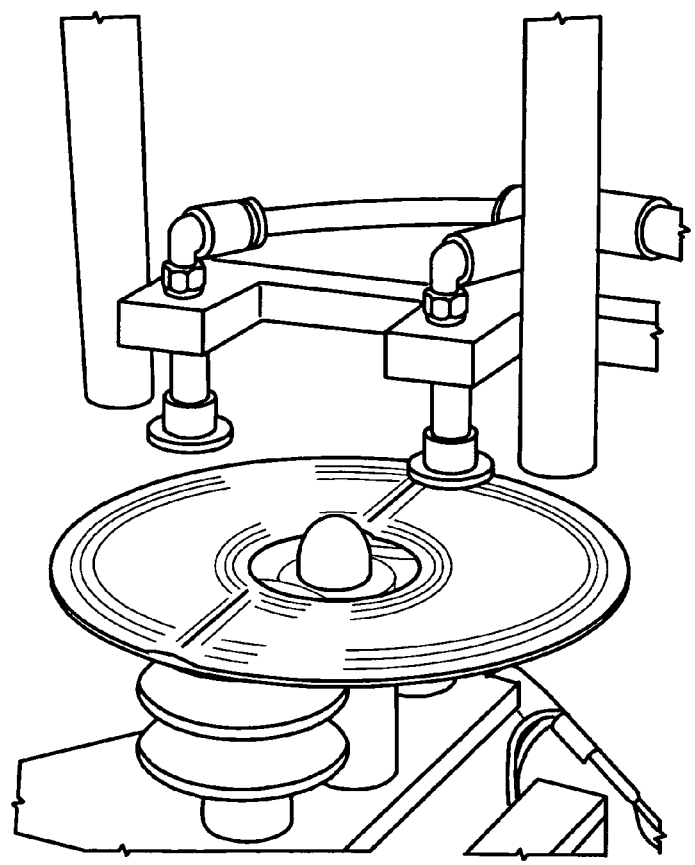
Figure 7D:
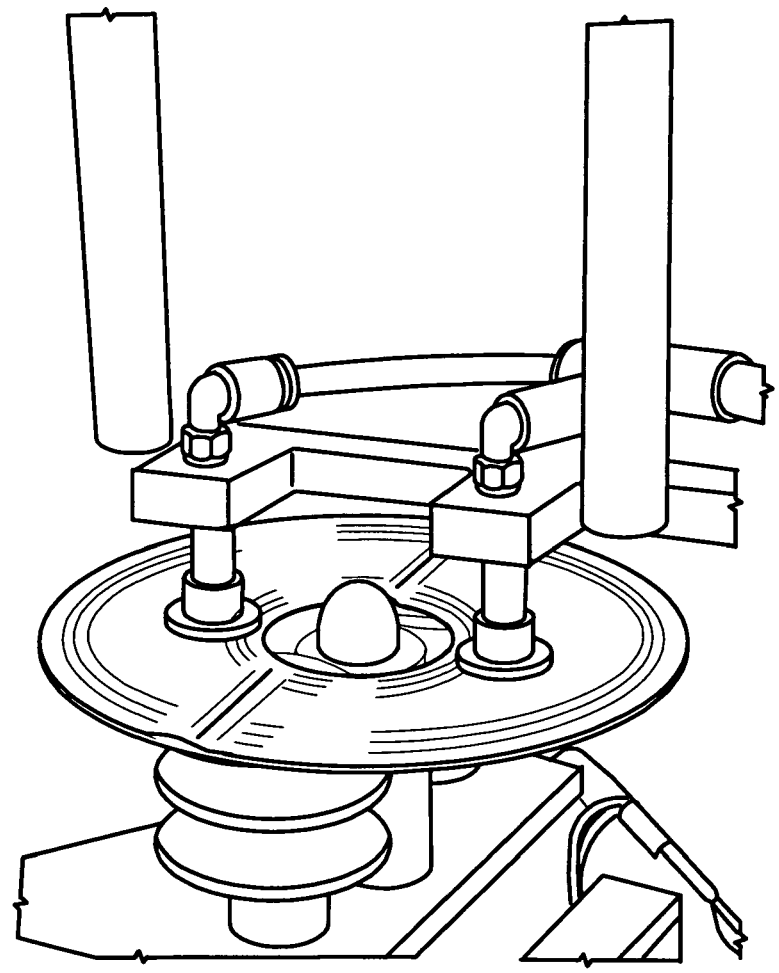
Figure 7E:
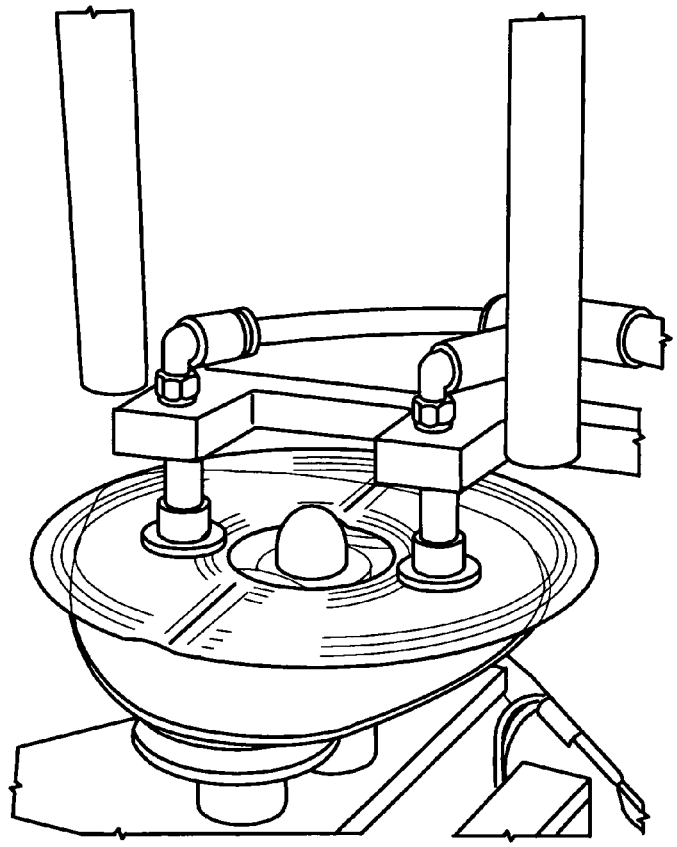
Figure 7F:
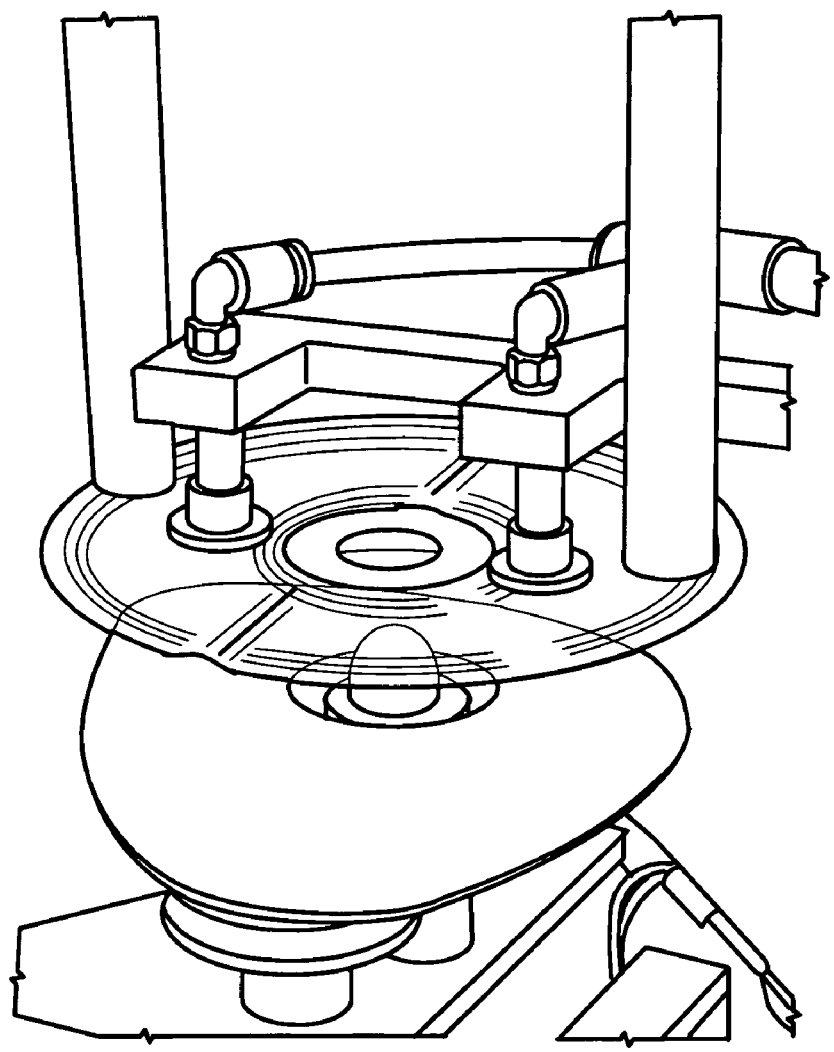
Figure 7G:
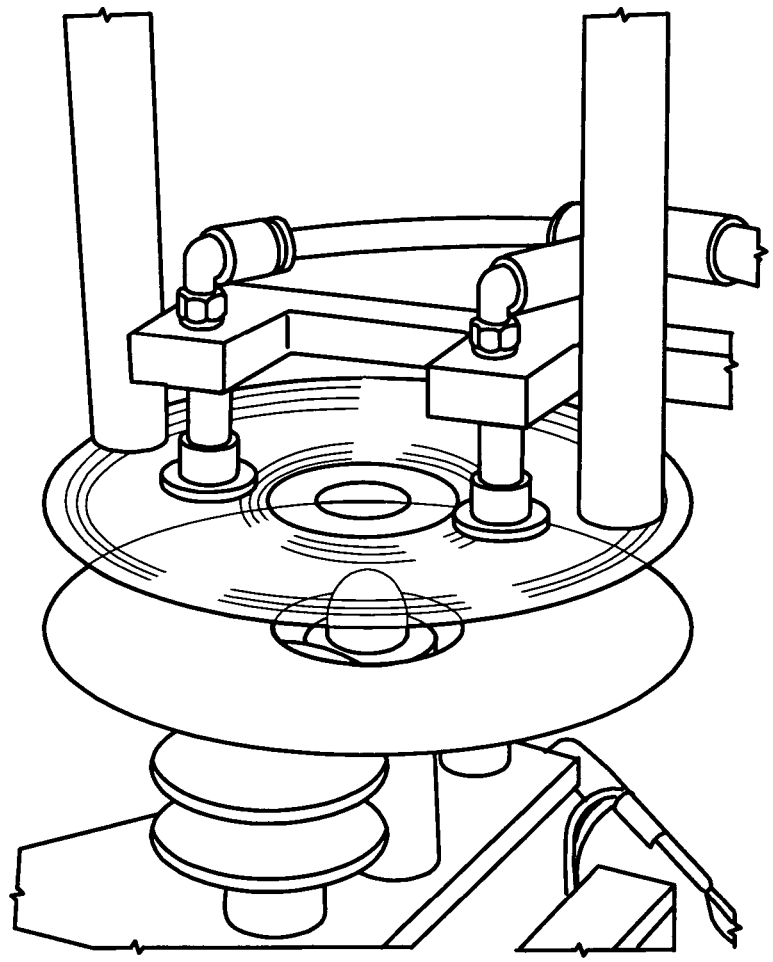

An example of a device which can successfully separate a PMMA dummy disc from a substrate for a BD-DL disc is shown in FIG. 6. A method, according to an exemplary embodiment, for separating a PMMA dummy disc from a substrate for a BD-DL disc utilizing the device of FIG. 6 is discussed below with reference to FIGS. 7A-7G.

In step S501 (FIG. 7A), a disc is placed on a chuck or disc carrier, where the disc is supported only in the center, and the outside is free to flex in any direction. A pair of bellow suction cups is below the disc at approximately the 3 and 9 o'clock positions. The PMMA side is facing up. Two suction cups are placed on the PMMA side of the disc at the 12 and 6 o'clock positions.

In step S502 (FIG. 7B), a downward force is applied by a pair of arms to the disk at the outer diameter at the 12 and 6 o'clock positions until the PMMA side breaks. The break will be from approximately the 3 o'clock position to approximately the 9 o'clock position. The bond around the break has released. The only area still bonding the PMMA dummy disc to the substrate is from the area around the push points to the outer diameter of the disc.

In step S503 (FIG. 7C), the pressure is removed and the disc flexes back to it's original shape. In step S504 (FIG. 7D), vacuum is applied to the two suction cups placed under the disc. The vacuum in the suction cups pulls the substrate down and the disc is flexed in a direction 90 degrees offset from FIG. 7B. This flexing causes the flawless release of the substrate disc from the PMMA dummy disc.

In step S505 (FIG. 7E), vacuum is applied to the top suction cups. In step S506 (FIG. 7F), the top suction cups are raised to remove the PMMA dummy disc from the substrate. In step S507 (FIG. 7G), vacuum is released from the bottom suction cups The method illustrated in FIGS. 7A-7G utilizing the device shown in FIG. 6 has the advantage of not creating release stains caused by minute pit damage, as experienced with conventional approaches used in DVD 14 and 18 production, and can also be applied to replicating other types of multi layer optical media (such as DVD14, DVD18, BD100, HD45, HD60, hybrid formats, etc.).

The examples and exemplary embodiments above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

In addition, it should be apparent that the apparatus can be configured to hold the substrate and dummy disc in a different orientation than as shown in FIGS. 7A through 7G, and the force applied to break the dummy disc may be applied from a different direction (and consequently the substrate flexes in a different direction).

Further, in the discussion above, read-only format discs are posed as examples. It should be apparent after a reading of this patent disclosure, however, that the techniques of this disclosure apply similarly to recordable (write once read many times) and rewritable format discs.

What is claimed is:

1. A method for separating a dummy disc from a subject disc, said method including:
    placing onto a disc carrier a subject disc bearing a dummy disc adhering to a first surface of said subject disc, wherein an outer portion of the subject disc is permitted to flex;
    applying a force to two opposing points on an exposed surface of said dummy disc until the dummy disc flexes in a first direction and subsequently breaks, and then removing said force;
    applying vacuum through a first suction device to two locations of a second surface of the subject disc opposite the first surface of said subject disc, to flex the subject disc in a second direction approximately 90° to said first direction; and
    applying vacuum through a second suction device to the exposed surface of said dummy disc and moving the dummy disc in a direction away from the subject disc.

2. The method of claim 1, further comprising removing the vacuum from the second suction device and allowing the subject disc to flex back to a resting position of the subject disc.

3. A method for manufacturing multi-layer optical storage media, the method comprising:
    (a) molding a substrate including an information bearing side and applying a first reflective layer over the information-bearing side of the substrate;
    (b) molding a dummy disc and applying a second reflective layer over the dummy disc;
    (c) applying an adhesive resin over said first reflective layer;
    (d) forming a subject disc by applying a side of the dummy disc bearing said second reflective layer onto said adhesive resin; and (e) placing onto a disc carrier the subject disc wherein an outer portion of the subject disc is permitted to flex;

(f) applying a force to two opposing points on an exposed surface of said dummy disc until the dummy disc flexes in a first direction and subsequently breaks, and then removing said force;

g) applying vacuum through a first suction device to two locations of a second surface of the substrate opposite the information-bearing side of the substrate, to flex the subject disc in a second direction approximately 90° to said first direction; and (h) applying vacuum through a second suction device to the exposed surface of said dummy disc and moving the dummy disc in a direction away from the subject disc.

4. The method of claim 3, further comprising:

applying a protective cover layer over said second reflective layer of said subject disc.

5. An apparatus for separating a dummy disc from a subject disc bearing the dummy disc adhering to a first surface of said subject disc, said apparatus including:

a disc carrier configured to support a central portion of the subject disc while allowing an outer portion of the subject disc to flex;

a pair of force applying members configured to move in a first direction towards an exposed surface of said dummy disc to apply a force to two opposing points on the exposed surface of said dummy disc until the dummy disc flexes in a first direction and subsequently breaks, and then move in a second direction to remove said force;

a first suction device configured to apply vacuum to two locations of a second surface of the subject disc opposite the first surface of said subject disc, to flex the subject disc in a second direction approximately 90° to said first direction; and a second suction device configured to apply vacuum to the exposed surface of said dummy disc and moving the dummy disc in a direction away from the subject disc.

\* \* \* \* \*